United States Patent
Kubo (10) Patent No.: US 10,571,832 B2
(45) Date of Patent: Feb. 25, 2020

(54) INTERMEDIATE TRANSFEROR, METHOD OF MAKING THE SAME, AND IMAGE FORMING APPARATUS USING THE SAME

(71) Applicant: Hidetaka Kubo, Kanagawa (JP)

(72) Inventor: Hidetaka Kubo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/894,988

(22) Filed: Feb. 13, 2018

(65) Prior Publication Data

US 2018/0267435 A1 Sep. 20, 2018

(30) Foreign Application Priority Data

Mar. 17, 2017 (JP) .................. 2017-053290

(51) Int. Cl.
| | |
|---|---|
| G03G 15/16 | (2006.01) |
| G03G 15/01 | (2006.01) |
| B29C 41/00 | (2006.01) |
| B29C 41/26 | (2006.01) |
| B29C 41/46 | (2006.01) |
| B05D 3/02 | (2006.01) |
| B05D 1/12 | (2006.01) |
| B05D 1/26 | (2006.01) |
| B29L 29/00 | (2006.01) |
| B29K 79/00 | (2006.01) |

(52) U.S. Cl.
CPC ............ *G03G 15/162* (2013.01); *B05D 1/12* (2013.01); *B05D 1/26* (2013.01); *B05D 3/0254* (2013.01); *B29C 41/003* (2013.01); *B29C 41/26* (2013.01); *B29C 41/46* (2013.01); *G03G 15/0189* (2013.01); *B29K 2079/08* (2013.01); *B29L 2029/00* (2013.01); *G03G 2215/16* (2013.01)

(58) Field of Classification Search
None
See application file for complete search history.

(56) References Cited

U.S. PATENT DOCUMENTS

| | | | | |
|---|---|---|---|---|
| 3,639,245 | A | * 2/1972 | Nelson ................. | G03G 9/0808 430/108.1 |
| 4,265,993 | A | * 5/1981 | Kawanishi ........... | G03G 9/0823 428/407 |

(Continued)

FOREIGN PATENT DOCUMENTS

| | | |
|---|---|---|
| JP | 9-230717 | 9/1997 |
| JP | 11-316482 A | 11/1999 |

(Continued)

OTHER PUBLICATIONS

Extended European Search Report dated Jul. 17, 2018 in European Patent Application No. 18154743.1, 8 pages.

(Continued)

*Primary Examiner* — Sevan A Aydin
(74) *Attorney, Agent, or Firm* — Oblon, McClelland, Maier & Neustadt, L.L.P.

(57) ABSTRACT

An intermediate transferor (22;501) for an image forming apparatus includes a base layer (11), an elastic layer (12) layered on the base layer (11), and fine particles (13) on the elastic layer (12) to form an uneven surface of the elastic layer (12). The fine particles (13) have a volume resistivity of $1 \times 10^0$ Ω·cm to $1 \times 10^6$ Ωcm.

11 Claims, 5 Drawing Sheets

(56) References Cited

U.S. PATENT DOCUMENTS

| | | | |
|---|---|---|---|
| 5,665,512 A * | 9/1997 | Tsutsui | G03G 9/091 430/108.11 |
| 5,845,186 A | 12/1998 | Obu | |
| 9,546,286 B2 * | 1/2017 | Step | C09C 1/48 |
| 2002/0067934 A1 | 6/2002 | Jia et al. | |
| 2003/0065090 A1 | 4/2003 | Kelly et al. | |
| 2007/0122726 A1 * | 5/2007 | Mizuhata | G03G 9/0833 430/106.1 |
| 2011/0042856 A1 | 2/2011 | Aoto et al. | |
| 2011/0177238 A1 | 7/2011 | Aoto et al. | |
| 2012/0082488 A1 | 4/2012 | Kubo et al. | |
| 2012/0201578 A1 | 8/2012 | Mashiko et al. | |
| 2013/0004212 A1 | 1/2013 | Kubo et al. | |
| 2013/0129395 A1 | 5/2013 | Kubo et al. | |
| 2014/0248069 A1 | 9/2014 | Kubo et al. | |
| 2014/0248070 A1 | 9/2014 | Kubo et al. | |
| 2015/0241817 A1 | 8/2015 | Kubo et al. | |
| 2015/0261139 A1 | 9/2015 | Kubo et al. | |
| 2016/0161888 A1 * | 6/2016 | Wada | G03G 15/1665 399/66 |
| 2016/0170332 A1 * | 6/2016 | Yoshida | G03G 15/162 399/302 |
| 2017/0269513 A1 | 9/2017 | Kubo et al. | |

FOREIGN PATENT DOCUMENTS

| | | |
|---|---|---|
| JP | 2002-162767 | 6/2002 |
| JP | 2002-356654 | 12/2002 |
| JP | 2004-354716 | 12/2004 |
| JP | 2007-254558 | 10/2007 |
| JP | 2007-328165 | 12/2007 |
| JP | 2009-075154 | 4/2009 |
| JP | 2012-189724 | 10/2012 |
| JP | 2012-194223 | 10/2012 |
| JP | 2015-148660 | 8/2015 |

OTHER PUBLICATIONS

Office Action dated Mar. 26, 2019 in corresponding European Patent Application No. 18 154 743.1, 5 pages.

* cited by examiner

INTERMEDIATE TRANSFEROR, METHOD OF MAKING THE SAME, AND IMAGE FORMING APPARATUS USING THE SAME

CROSS-REFERENCE TO RELATED APPLICATION

This patent application is based on and claims priority pursuant to 35 U.S.C. § 119 to Japanese Patent Application No. 2017-053290, filed on Mar. 17, 2017 in the Japanese Patent Office, the entire disclosure of which is hereby incorporated by reference herein.

BACKGROUND

Technical Field

The present disclosure relates to an intermediate transferor and an image forming apparatus using the same.

Background Art

Recent full-color electrophotographic apparatuses employ an intermediate transfer belt system, in which developed images of four colors, yellow, magenta, cyan, and black, are superimposed on an intermediate transfer belt temporarily, and collectively transferred onto a transfer medium such as paper.

In order to achieve a high transfer rate irrespective of transfer media, improve toner releasability, and obtain a flexible transfer belt, intermediate transfer belts have a base layer, a flexible rubber elastic layer laminated on the base layer, and a layer made of fine particles on the flexible rubber elastic layer.

SUMMARY

This specification describes an improved intermediate transferor for an image forming apparatus. In one illustrative embodiment, the intermediate transferor includes a base layer, an elastic layer layered on the base layer, and fine particles on the elastic layer, to form an uneven the surface of the elastic layer. The fine particles have a volume resistivity of $1 \times 10^0$ Ω·cm to $1 \times 10^6$ Ω·cm.

This specification further describes an improved method of making an intermediate transferor for an image forming apparatus. In one illustrative embodiment, the method includes forming a base layer, layering an elastic layer on the base layer, and forming an uneven surface of the elastic layer with fine particles having volume resistivity of $1 \times 10^0$ Ω·cm to $1 \times 10^6$ Ω·cm.

BRIEF DESCRIPTION OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected, and it is to be understood that each specific element includes all technical equivalents that have a similar function, operate in a similar manner, and achieve a similar result.

As used herein, the singular forms "a", "an" and "the" are intended to include the plural forms as well, unless the context clearly indicates otherwise. The configurations related to the present disclosure are described based on embodiments illustrated in the accompanied drawings. It is to be noted that identical reference numerals are assigned to identical components or equivalents and description of those components is simplified or omitted.

In the intermediate transferor in the background art, an insulating material having high electrical resistance is used for both particles and a coating agent. The use of the intermediate transferor including high electrical resistance particles causes the following problems: When the image forming apparatus outputs a halftone solid image in which a halftone image and a solid image are both on one sheet, transfer of the solid image that includes a lot of toner needs a high transfer current, especially in full-color mode. The high transfer current flows into the toner in the halftone image in which the toner amount is small, and may charge the toner oppositely. The force of the transfer electric field then fails to transfer the oppositely charged toner, and as a result, the transfer rate greatly decreases.

The use of the intermediate transferor in the background art causes such significant decrease in transfer rate of halftone in full color mode. The decrease in transfer rate of halftone is especially prominent in the black image. In the present disclosure, the use of an intermediate transferor in which fine particles having a volume resistivity of $1 \times 10^0$ Ωcm to $1 \times 10^6$ Ωcm disposed on the surface of an elastic layer prevents the above-described decrease in transfer rate.

Intermediate Transferor

The intermediate transferor of the present disclosure transfers a toner image obtained by developing a latent image formed on an image bearer onto itself. The intermediate transferor includes a base layer and an elastic layer on the base layer. The elastic layer has fine particles that make a convex-concave shape on the surface of the elastic layer.

Figure 1:
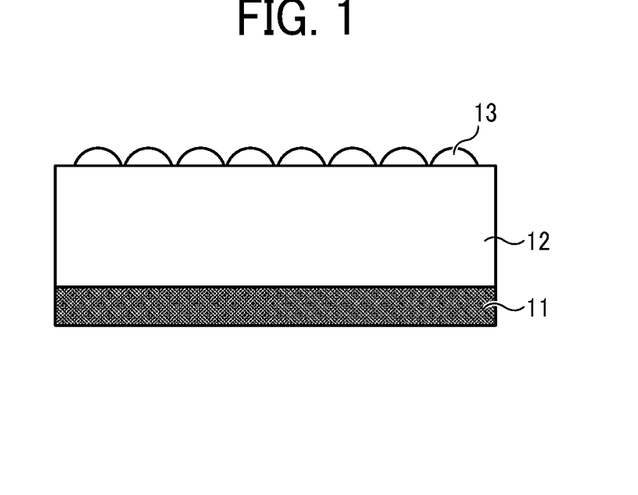
FIG. 1 is a schematic diagram illustrating an example of a layer structure of an intermediate transferor according to the present disclosure.

The volume resistivity of the fine particles is $1\times10^0$ Ω·cm to $1\times10^6$ Ω·cm. The intermediate transferor may have other members as necessary. With reference to FIG. 1, the layer structure of the intermediate transferor according to the present disclosure is described. Specifically, the structure includes a relatively bendable rigid base layer 11, a flexible elastic layer 12 layered on the base layer 11, and spherical particles 13 at an outermost surface of the flexible elastic layer 12. The spherical particles 13 are each separately aligned on the elastic layer 12 along its plane direction, embedded in the state where a top part of each particle is exposed, and uniformly laminated on the flexible elastic layer 12 in the convex-concave shape. When the fine particles 13 of the present disclosure are one type, the fine particles 13 do not overlap each other in a layer thickness direction nor completely buried in the elastic layer 12. The intermediate transferor may be a belt type or a drum type. The present disclosure does not particularly limit the form of the intermediate transferor, which can be selected appropriately. However, preferably, the intermediate transferor is an intermediate transfer belt, particularly an endless belt, that is, a so-called seamless intermediate transfer belt. Hereinafter, as a specific embodiment, an intermediate transfer belt is described as an example.

Base Layer

The base layer 11 is described with reference to FIG. 1.

The base layer contains a resin and an electrical resistance-adjusting agent, and further contains other components if necessary.

Resin

From the viewpoint of flame resistance, examples of the resin include fluorine-based resins such as polyvinylidene fluoride (PVDF) and ethylenetetrafluoroethylene (ETFE), polyimide resins, polyamide-imide resins, and the like. Among them, from the viewpoint of mechanical strength (high elasticity) and heat resistance, a polyimide resin or a polyamide-imide resin is preferable.

The polyimide resin or polyamide-imide resin is not particularly limited and may be appropriately selected according to the purpose. For example, the polyimide resin or polyamide-imide resin may be obtained and used for general-purpose products from manufacturers such as Du Pont-Toray Co., Ltd., Ube Industries, Ltd., New Japan Chemical Co., Ltd., JSR Corporation, UNITIKA LTD., I.S.T., Hitachi Chemical Co., Ltd., TOYOBO CO., LTD., and Arakawa Chemical Industries, Ltd.

Electrical Resistance Controlling Agent

The electrical resistance controlling agent is not particularly limited and may be appropriately selected according to the purpose, and examples thereof include a metal oxide, carbon black, an ion conductive agent, a conductive polymer material, and the like. Examples of metal oxides include zinc oxide, tin oxide, titanium oxide, zirconium oxide, aluminum oxide, and silicon oxide. In order to improve the dispersibility, surface treatment may be applied to the metal oxides in advance. Examples of carbon blacks include ketchen black, furnace black, acetylene black, thermal black, and gas black. Examples of ion conductive materials include tetraalkylammonium salt, trialkyl benzyl ammonium salt, alkylsulfonate, alkylbenzene sulfonate, alkylsulfate, glycerol esters of fatty acid, sorbitan fatty acid ester, polyoxyethylene alkylamine, polyoxyethylene aliphatic alcohol ester, alkylbetaine, and lithium perchlorate. The electrical resistance controlling agent can be used alone or in combination with others.

The resistance value of the intermediate transferor is preferably $1\times10^8$ to $1\times10^{13}$ Ω/□ in the surface resistance and $1\times10^8$ Ω·cm to $1\times10^{11}$ Ω·cm in the volume resistance. The electrical resistance controlling agent may be contained so that the intermediate transferor has the above resistance value. However, from the viewpoint of mechanical strength, the amount of the electrical resistance controlling agent is adjusted so that the film does not become fragile and easily break. Preferably, a coating liquid, in which a mixture of the resin component (for example, polyimide resin precursor or polyamide-imide resin precursor) and the electrical resistance controlling agent are adjusted properly, is used to manufacture the intermediate transfer belt in which the electrical characteristics (i.e., the surface resistivity and the volume resistivity) and the mechanical strength are well balanced.

An amount of the electrical resistance controlling agent is appropriately selected depending on the intended purpose without any limitation, which is within the skill of the ordinary artisan. In the case where the electrical resistance controlling agent is carbon black, the amount thereof is preferably 10% by mass to 25% by mass, more preferably 15% by mass to 20% by mass, relative to the total solid content of the coating liquid. In the case where the electrical resistance controlling agent is metal oxide, the amount thereof is preferably 1% by mass to 50% by mass, more preferably 10% by mass to 30% by mass, relative to the total solid content of the coating liquid. The content of the electrical resistance controlling agent less than the preferable range makes it difficult to obtain uniformity of the resistance value, and increase fluctuation of the resistance value with respect to an arbitrary potential. On the other hand, the content of the electrical resistance controlling agent more than the preferable range weakens the mechanical strength of the intermediate transfer belt, which is not preferable for practical use.

Other Components

Examples of the other components include a dispersion aid, a reinforcing agent, a lubricant, a thermal conductive agent, an antioxidant, and the like.

The average thickness of the base layer 11 is not limited to a particular thickness and can be selected depending on the purpose. The thickness of the base layer 11 is preferably in a range from 30 μm to 150 μm, more preferably in a range from 40 μm to 120 μm, even more preferably, in a range from 50 μm to 80 μm.

If the thickness of the base layer is 30 μm or more, it is possible to prevent the belt from breaking due to cracking, and if it is 150 μm or less, cracking of the belt due to bending can be prevented. The thickness of the base layer 11 in the above-described respective range enhances the durability. In order to improve running stability of the intermediate transfer belt, preferably, the thickness of the base layer 11 is uniform as much as possible.

A measurement method to measure the thickness of the base layer 11 is not limited to a particular method, and can be selected as needed. For example, the thickness of the base layer 11 can be measured using a contact-type, an eddy-current thickness meter, or a scanning electron microscope (SEM) which measures a cross-section of the film.

Elastic Layer

The elastic layer 12 layered on the base layer 11 is described with reference to FIG. 1. The elastic layer is not particularly limited as long as its surface has fine particles and the convex-concave shape due to the fine particles, and can be appropriately selected according to the purpose, but the elastic layer includes an elastic material and further may include other components if necessary. The convex-concave shape on the surface of the elastic layer 12 can be observed and confirmed, for example, by LEXTOLS4100 (manufactured by OLYMPUS CORPORATION).

Elastic Material

The elastic material is not particularly limited as long as the elastic material has sufficient flexibility (elasticity), and can be appropriately selected according to the purpose, and examples thereof include a resin, an elastomer, a rubber, or the like. An elastomer material or a rubber material is preferable in the above materials.

Examples of the elastomer include thermoplastic elastomers and thermosetting elastomers. Examples of the thermoplastic elastomer include, but are not limited to, a polyester thermoplastic elastomer, a polyamide thermoplastic elastomer, a polyether thermoplastic elastomer, a polyurethane thermoplastic elastomer, a polyolefin thermoplastic elastomer, a polystyrene thermoplastic elastomer, a polyacryl thermoplastic elastomer, a polydiene thermoplastic elastomer, a silicone-modified polycarbonate thermoplastic elastomer, a fluorocopolymer thermoplastic elastomer, and the like. Examples of the thermosetting elastomer include a polyurethane thermosetting elastomer, a silicone-modified epoxy thermosetting elastomer, a silicone-modified acryl thermosetting elastomer, and the like.

Examples of the rubber material include, but are not limited to, isoprene rubber, styrene rubber, butadiene rubber, nitrile rubber, ethylenepropylene rubber, butyl rubber, silicone rubber, chloroprene rubber, acrylic rubber, chlorosulfonated polyethylene, fluorine rubber, urethane rubber, and hydrin rubber. Among the above materials, acrylic rubber is particularly preferable from the viewpoint of ozone resistance, flexibility, adhesion to particles, flame resistance, and environmental stability. The acrylic rubber is described below.

The acrylic rubber is not particularly limited and can be appropriately selected according to the purpose. For example, the acrylic rubber of carboxyl group crosslinking type is preferable since the acrylic rubber of the carboxyl group crosslinking type among the acrylic rubber of cross linking types (e.g., an epoxy group, an active chlorine group, and a carboxyl group) provides good rubber physical properties (specifically, the compression set) and good workability.

An amine compound is preferable as a cross-linker used for the acrylic rubber of carboxyl group cross-linking type. A multivalent amine compound is more preferable as the cross-linker for the acrylic rubber of carboxyl group cross-linking type. Examples of the amine compounds include, but are not limited to, aliphatic multivalent amine crosslinking agents and aromatic multivalent amine crosslinking agents. Furthermore, examples of the aliphatic multivalent amine crosslinking agents include, but are not limited to, hexamethylenediamine, hexamethylenediamine carbamate, and N,N'-dicinnamylidene-1,6-hexanediamine. Examples of the aromatic multivalent amine crosslinking agents include, but are not limited to, 4,4'-methylenedianiline, m-phenylenediamine, 4,4'-diaminodiphenyl ether, 3,4'-diaminodiphenyl ether, 4,4'-(m-phenylenediisopropylidene) dianiline, 4,4'-(p-phenylenediisopropylidene) dianiline, 2,2'-bis ¥[4-(4-aminophenoxy)phenyl] propane, 4,4'-diaminobenzanilide, 4,4'-bis(4-aminophenoxy)biphenyl, m-xylylenediamine, p-xylylenediamine, 1,3,5-benzenetriamine, and 1,3,5-benzenetriaminomethyl. The amount of the crosslinking agent is preferably 0.05 parts by mass to 20 parts by mass, more preferably 0.1 parts by mass to 5 parts by mass, relative to 100 parts by mass of acrylic rubber. When the amount of the crosslinking agent is 0.05 parts by mass to 20 parts by mass, crosslinking is appropriately performed, and the crosslinked products have good physical properties such as shape retention and elasticity.

The acrylic rubber elastic layer may further contain a crosslink accelerator in combination with a crosslinking agent. The crosslinking accelerator is not particularly limited and may be appropriately selected according to the purpose, but preferably can be used in combination with the polyamine crosslinking agent. Examples of such crosslink accelerator include a guanidine compound, an imidazole compound, a quaternary onium salt, a tertiary phosphine compound, a weak acid alkali metal salt, and the like. Examples of the guanidine compound include 1,3-diphenyl guanidine, and 1,3-diorthotolyl guanidine. Examples of the imidazole compound include 2-methylimidazole, and 2-phenylimidazole. Examples of the quaternary onium salt include tetra-n-butylammonium bromide, and octadecyl tri-n-butylammonium bromide. Examples of the polyvalent tertiary amine compound include triethylene diamine, and 1,8-diazabicyclo¥[5.4.0]undec7-ene (DBU). Examples of the tertiary phosphine compound include triphenyl phosphine, and tri-p-tolylphosphine. Examples of the weak acid alkali metal salt include inorganic weak acid salts such as phosphate and carbonate of sodium or potassium; and organic weak acid salts such as a stearic acid salt, and a lauric acid salt.

The amount of the crosslink accelerator is preferably 0.1 parts by mass to 20 parts by mass, more preferably 0.3 parts by mass to 10 parts by mass, relative to 100 parts by mass of the acrylic rubber. An excessive amount of crosslink accelerator may accelerate cross-linking, cause the crosslink accelerator to bloom on the surface of the cross-linked product, or result an excessively hard crosslink product. An insufficient amount of the crosslinking agent may cause degradation of the tensile strength of the crosslinked products and a significant elongation change or a significant change in the tensile strength after heat load.

Other Components

The other components are not particularly limited and may be appropriately selected according to the purpose. Examples of the other components include an electrical resistance controlling agent, a fire-retardant, an antioxidant, a reinforcing agent, a filler, a vulcanization accelerator, and the like. These may be used alone, or in combination.

The acrylic rubber composition of the present disclosure can be prepared by an appropriate mixing procedure such as roll mixing, Banbury mixing, screw mixing, and solution mixing. The order in which the ingredients are mixed is not particularly limited. However, it is preferable that ingredients that are not easily reacted or decomposed when heated are first mixed thoroughly, and thereafter, ingredients that are easily reacted or decomposed when heated, such as a crosslinking agent, are mixed together in a short period at a temperature at which the crosslinking agent is neither reacted nor decomposed.

The acrylic rubber can be formed into a crosslinked product by heating. The heating temperature is preferably 130° C. to 220° C., more preferably 140° C. to 200° C. The duration for crosslink is preferably 30 seconds to 5 hours. The heating methods can be chosen from those that are used for crosslinking rubber compositions, such as press heating, steam heating, oven heating, and hot-air heating. After performing a process for crosslink, a post crosslink process may be performed to make the inner part of the crosslinked product surely crosslinked. The duration for the post crosslink may vary depending on the heating method, crosslink temperature, and the shape of the product, but it is preferably 1 hour to 48 hours. The heating method and temperature for the post crosslink may be appropriately selected.

The micro rubber hardness value at 25° C. and 50% RH in the elastic layer is preferably from 30 to 80. The micro rubber hardness can be measured by use of a commercial micro rubber hardness meter, for example, a micro rubber hardness meter MD-1, manufactured by KOBUNSHI KEIKI CO., LTD.

An average thickness of the elastic layer is preferably 200 µm to 500 µm, more preferably 300 µm to 400 µm. When the average thickness is 200 µm or more, the image quality is good with respect to the paper type having irregularities on the surface, and when the average thickness is 600 µm or less, the weight of the elastic layer is appropriate, and no deflection or warpage occurs, which cause stable running. The thickness of the belt is the thickness in the absence of the particles and the average value is calculated from 10 points of the measured values. Moreover, the thickness of the belt is measured by observing a cross-section surface of the belt under a scanning electron microscope (SEM VE-7800 manufactured by KEYENCE CORPORATION).

Fine Particles

The fine particles 13 formed on the surface of the elastic layer in FIG. 1 is described. The volume resistivity of the fine particles is $1 \times 10^0$ Ω·cm to $1 \times 10^6$ Ω·cm, more preferably $1 \times 10^1$ Ω·cm to $1 \times 10^3$ Ω·cm. The constituent material and structure of the fine particles is not particularly limited as long as the fine particles have the above-mentioned predetermined volume resistivity. The structure of the fine particles can be appropriately selected according to the purpose, and may be, for example, a single layer structure or a two-layer structure that has a core-shell structure formed by coating base particles with resin as described below. For example, the fine particles of the core-shell structure may be made by covering a surface of an insulating particle or a high-resistance particle with a conductive resin by coating or polymerization reaction, or by covering the surface with a metal by electroless plating method. In addition, the shape of the fine particles is not particularly limited as long as the fine particles have the above-mentioned predetermined volume resistivity. The shape of the fine particles can be appropriately selected according to the purpose, for example, the shape of the fine particles may be spherical or irregular. Preferably, the shape of the fine particles is spherical, and in particular, the spherical fine particles preferably have high sphericity as described below. When the fine particles have the core-shell structure described above, preferably, the base particles have a spherical shape. This is because if the base particles are spherical, the shape of the fine particles after coating the resin easily becomes spherical. As for the size of the fine particles, the average particle size is preferably 100 µm or less. There is no problem as long as the particle size of the fine particles is such that toner does not enter the gaps between the fine particles when the fine particles are filled on the elastic layer. Preferably, the average particle diameter is 5 µm or less, more preferably 0.5 µm to 5 µm, and even more preferably 1 µm to 2 µm.

Specific Embodiment of the Fine Particles

From the viewpoint of transferability, the fine particles are preferably obtained by coating a conductive layer on the surface of particles having high electrical resistance. FIG. 2B illustrates a schematic view of the fine particles of the core-shell structure obtained by coating the high resistant base particle with resin. As illustrated in FIG. 2B, the fine particle includes a base particle 13A that is the high resistant particle and a coated conductive layer 13B. Examples of the high resistant particles include fine particles made of acrylic resin, melamine resin, silicone resin, polyamide resin, polyester resin, or polyvinyl chloride resin. Examples of the conductive layer formed on the surface of the high resistance particles include a conductive resin layer made of conductive resin such as polypyrrole, polyaniline, polythiol, polythiophene, polyethylenedioxythiophene, poly 3, 4 ethylenedioxythiophene or the like, or a conductive layer formed by coating a metal plating of copper, silver, or the like. Above all, from the viewpoint of toner releasability, the conductive resin layer formed by coating the conductive resin of polythiophene or polypyrrole is more preferable. As a method of coating the surface of the high resistance particles with the conductive resin, a method of coating by spray coating on the surface of the particles may be adopted, or other known methods may be adopted. For example, plating process such as electroless plating process may be adopted. As the conductive resin, a commercially available product can be used, for example, polythiophene can be obtained from Nagase ChemteX Corporation, Heraeus Corporation, Rigaku Co., Ltd., or the like. Polyaniline, polyethylene dioxythiophene, and poly-3,4 ethylenedioxythiophene can be obtained from Kakensangyou Co., Ltd. or Sankyo Kasei Industry Co., Ltd. The volume resistivity of the fine particles is appropriately adjusted by changing the thickness of the coating layer made of the material having a low resistance such as the above conductive resin. For example, the thickness of the coat layer is decreased to adjust the volume resistivity higher and increased to adjust the volume resistivity lower. In adjusting the use of a high conductive material such as metal for the coat layer, care is taken not to lower the volume resistivity of the fine particles below the lower limit of the above range.

Volume Resistivity of the Fine Particles

The volume resistivity of the fine particles is $1 \times 10^0$ Ω·cm to $1 \times 10^6$ Ω·cm, more preferably $1 \times 10^1$ Ω·cm to $1 \times 10^3$ Ω·cm. In the intermediate transferor in the background art, an insulating material having high resistance is used for both particles and a coating agent. It is found that the use of the intermediate transferor disposed high resistance particles causes a significant decrease in transfer rate of halftone in full color mode. In the background art, the resistivity of the entire intermediate transfer belt including the base layer and the elastic layer is $1 \times 10^8$ to $1 \times 10^{13}$ Ω/□ in surface resistivity and $1 \times 10^7$ to $1 \times 10^{12}$ Ω·cm in volume resistivity. In the present embodiment, the volume resistivity of the fine particles is set in a low resistance region of $1 \times 10^6$ Ω·cm or less which is quite different from the order of the resistivity known as the resistivity of the whole intermediate transfer belt in the background art. The result of the present embodiment is as follows.

(1) Even if the volume resistivity of the fine particles is changed from high to low, there is no change in the overall resistivity of the entire intermediate transfer belt.

(2) Setting the volume resistivity of the fine particles in the range of $1 \times 10^0$ Ω·cm to $1 \times 10^6$ Ω·cm improves the transfer property of halftone in the full color mode. It is not clear why the volume resistivity of the fine particles set in the range of $1 \times 10^0$ to $1 \times 10^6$ Ω·cm improves the halftone transferability in the full color mode using the high transfer current.

High-resistance fine particles on the surface of the intermediate transfer belt may inhibit current to the intermediate transfer belt and cause discharge. The excessive discharge may reduce the charge of the toner and inhibit the transfer. On the other hand, fine particles on the surface of the intermediate transfer belt with too low a resistance may cause an excessive current on the surface of the intermediate transfer belt, and inhibits suitable discharge between the intermediate transfer belt and the image bearing member (a photoconductor) and between the intermediate transfer belt and the paper, which may inhibit the electric field formation for transferring the toner. Therefore, setting the volume resistivity of the fine particles on the surface of the intermediate transfer belt in the range of $1 \times 10^0$ to $1 \times 10^6$ Ω·cm strikes the optimum balance between discharge and electric field formation and provides good transferability.

Measuring Volume Resistivity of the Fine Particles

The volume resistivity of the fine particles can be measured with, for example, MCP-PD 51 of Mitsubishi Chemical Analytech Co., Ltd. or Loresta GP (High Resistor UP if the resistance is high). At 23° C. and 50% RH, 1 g of fine particles placed in a 15 mmφ pressurized container is applied a load of 4 KN, then a voltage of 20 KV is applied and current is measured. Based on the measured values, the volume resistivity of the fine particles is calculated.

State of the Fine Particles

Figure 2A:
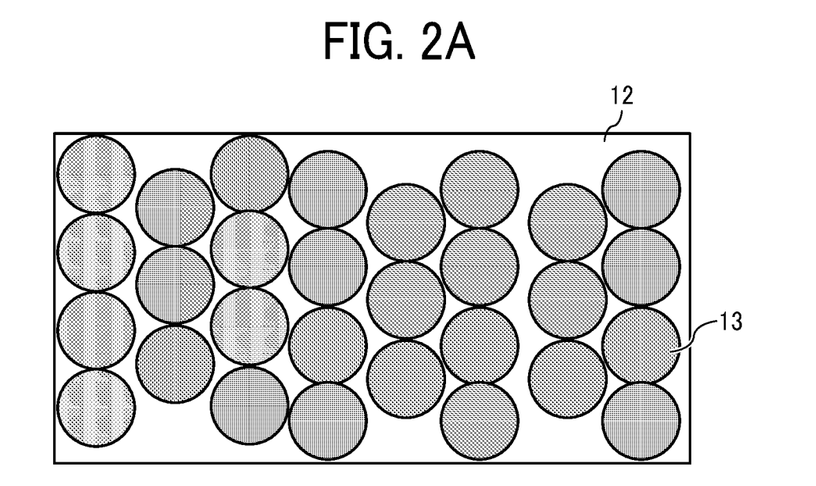
FIG. 2A is an enlarged schematic diagram of a surface of the intermediate transferor viewed from above.
Figure 2B:
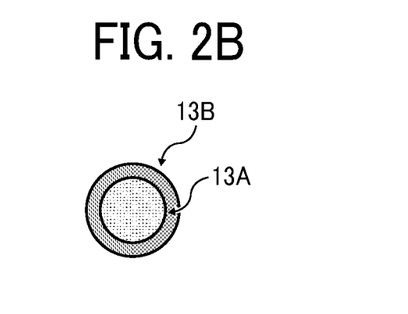
FIG. 2B is a schematic view illustrating an example of a structure of spherical fine particles of the present disclosure.

FIG. 2A is an enlarged schematic diagram of a surface of the intermediate transferor viewed from above. As illustrated in FIG. 2A, the fine particles having a uniform particle diameter are arranged neatly on the intermediate transferor independently. No particles overlapping each other are observed on the surface of the intermediate transferor. Preferably, the cross-sectional diameters of the fine particles in the surface of the elastic layer are uniform. Specifically, the distribution width thereof is preferably equal to or less than ±(Average particle diameter×0.5 μm). In order to form such a structure, it is preferable to use fine particles having the same particle size as much as possible. However, without preparing fine particles having the same particle diameter, a method in which fine particles having a predetermined particle size are selectively adhered to the surface may realize the structure configured by the fine particles having the above-mentioned distribution width. The occupied area ratio of the surface of the elastic layer by the fine particles is preferably 60% or more. The occupied area ratio of 60% or more is an appropriate exposure of the resin portion of the elastic layer and gives good transferability.

The fine particles are partially embedded in the elastic layer. An embedded rate of the fine particle in the elastic layer is preferably more than 50% and less than 100%, more preferably 51% to 90%. The embedded rate of 50% or less causes detachment of the fine particles during long-term use in the image forming apparatus, and degrades durability. On the other hand, the embedded rate of 100% is not preferable because the effect of improving transferability by spherical particles is reduced. The embedded rate is a percentage value obtained by dividing the length of the fine particle in the radial direction buried in the elastic layer by the diameter of the fine particle. The above range of embedded rate does not mean that the embedded rate of all the fine particles on the elastic layer is more than 50% and less than 100%. The above range of embedded rate means the average embedded rate of the fine particles observed in an arbitrary field of view is greater than 50% and less than 100%. However, in the cross section observation of the elastic layer with the embedded rate of 50% by the electron microscope, almost no particles completely buried in the elastic layer are observed. Specifically, the number percentage of the fine particles completely buried in the elastic layer was 5% or less of all spherical particles.

Sphericity of the Fine Particles

Figure 6A:
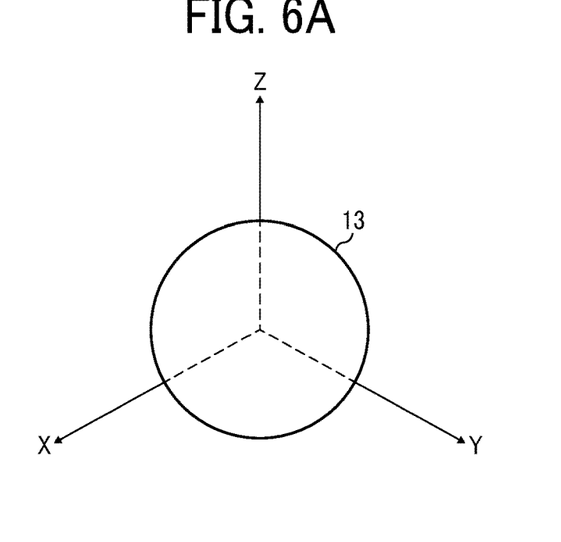
FIG. 6A is a schematic view illustrating the measurement of the sphericity of the spherical fine particles.
Figure 6B:
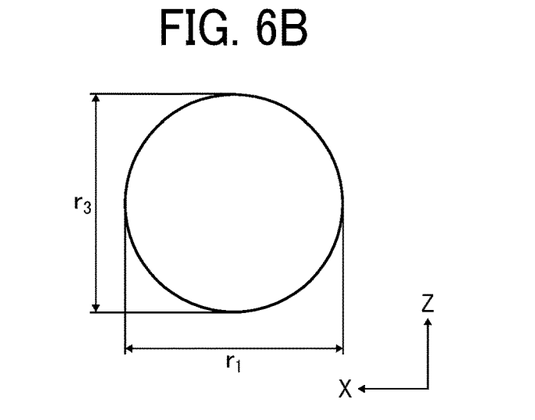
FIG. 6B is a schematic view illustrating the measurement of the sphericity of the spherical fine particles.
Figure 6C:
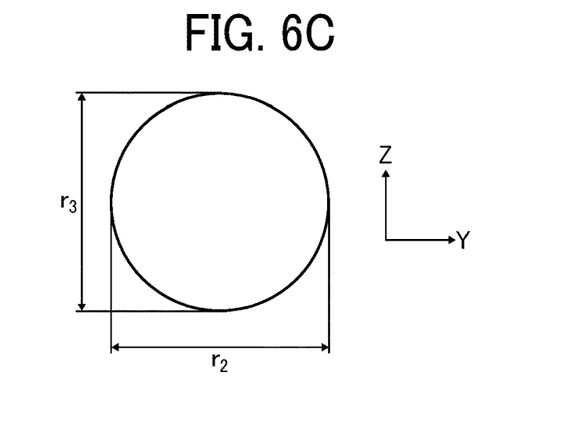
FIG. 6C is a schematic view illustrating the measurement of the sphericity of the spherical fine particles.

Spherical shape of the fine particles of the present disclosure improves transferability. It is preferable that the shape of the fine particles is a spherical shape having high sphericity. In the present disclosure, the sphericity is obtained as follows: The fine particles of the present disclosure are uniformly adhered to smooth surface and 100 fine particles were observed with color laser microscope "VK-8500" (manufactured by KEYENCE CORPORATION) by an optional magnification ratio (for example 1,000 times). As illustrated in FIGS. 6A, 6B, and 6C, long axes (r1 μm), short axes (r2 μm), and thickness (r3 μm) of 100 particles were measured, followed by calculating averages. The sphericity is obtained by this method. In the present disclosure, the perfect sphere is identified by the ratio (r2/r1) of the long axis to the short axis of 0.9 to 1.0 and the ratio (r3/r2) of the thickness to the short axis of 0.9 to 1.0.

Method of Making the Intermediate Transfer Belt

An example of a method of making the intermediate transfer belt of the present disclosure is described. Firstly, a method of making the base layer is described.

The base layer is made by using a coating liquid including at least a resin component, that is, a coating liquid including the polyimide resin precursor or the polyamide-imide resin precursor. While a cylindrical mold, for example, a cylindrical metal mold is being slowly rotated, a liquid supply device such as a nozzle or a dispenser supplies the coating liquid including at least the resin component (for example, the polyimide resin precursor or the polyamide-imide resin precursor) to the mold to apply the coating liquid over the entire outer surface of the cylindrical mold uniformly and form a coating film. Thereafter, the rotation speed of the cylindrical mold is increased to a predetermined speed, and after the rotation speed reaches the predetermined speed, the rotation speed is maintained at the predetermined speed and the rotation is continued for a desired time. While gradually increasing the temperature during the rotation, the solvent in the coating film is evaporated at a temperature of 80° C. to 150° C. In this process, it is preferable to efficiently circulate and remove the vapor of volatile solvent or the like. Once a self-supporting film is formed, the mold with the film is placed in a heating furnace (baking furnace) capable of performing a high temperature treatment. Then, the temperature of the furnace is increased stepwise, and eventually a high temperature heat treatment (baking) is performed at the temperature ranging from 250° C. to 450° C., to thereby sufficiently imidize the polyimide precursor or polyamide imidize the polyamide imide resin precursor. After sufficiently cooling the resulting film, the elastic layer is sequentially layered.

The elastic layer can be formed by applying a rubber coating liquid, which is prepared by dissolving rubber in an organic solvent, onto the base layer, followed by drying the solvent, and performing vulcanization. As for the coating method, likewise the formation of the base layer, conventional coating methods, such as spiral coating, die coating, and roll coating, can be used. Since a thickness of the elastic layer is preferably thick to improve convex-concave transfer property, die coating and spiral coating are excellent as a coating method for forming a thick film. The spiral coating is excellent as it can easily change the thickness of the elastic layer along the width direction as mentioned earlier. Therefore, the method using the spiral coating is described here. First, a rubber coating liquid is spirally applied onto the base layer, while rotating the base layer in the circumferential direction, by continuously supplying the rubber coating liquid from a round or broad-line nozzle and moving the nozzle along the axial direction of the base layer. The coating liquid spirally applied onto the base layer is leveled and dried by maintaining the predetermined rotational speed and drying temperature. Thereafter, the resultant is subjected to vulcanization (crosslinking) at the predetermined vulcanizing temperature, to thereby form an elastic layer. To change a thickness along the width direction, an ejection amount of the nozzle may be changed, or a distance between the nozzle and the metal mold may be changed, or the rotational speed of the metal mold may be changed.

Figure 3:
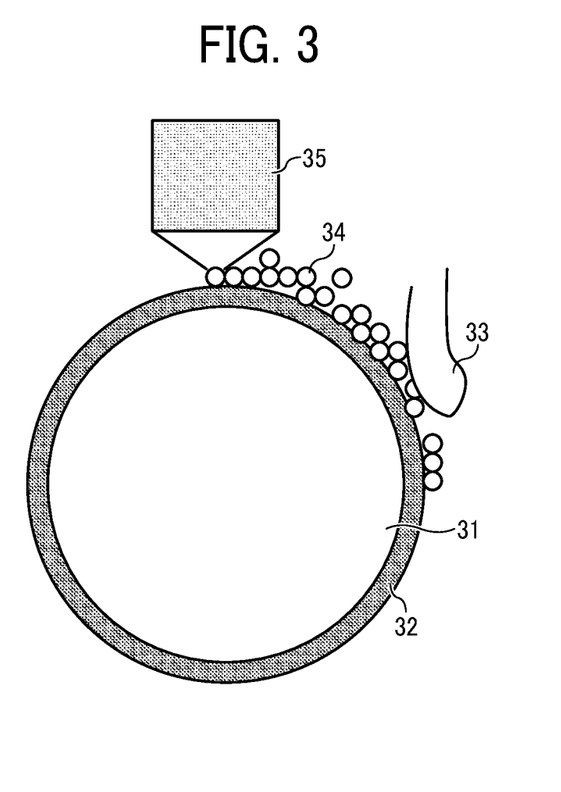
FIG. 3 is a schematic diagram illustrating an example of a method of applying the spherical fine particles to an elastic layer of the intermediate transferor.

The vulcanized elastic layer is sufficiently cooled, followed by applying the particles on the elastic layer and embedding the particles therein to thereby produce a desired intermediate transfer belt (a seamless belt). The method for embedding the fine particles in the exposed surface of the elastic layer includes, as illustrated in FIG. 3, providing a powder supplying device 35 and a pressing member 33, evenly applying fine particles 34 from the powder supplying device 35 to the surface of the elastic layer 32 while the cylindrical metal mold 31 rotates, and pressing the fine particles evenly spread on the surface with the pressing member 33 at constant pressure. The pressing member 33 embeds the fine particles in the elastic layer and removes surplus particles. In the present disclosure, the use of monodisperse fine particles particularly allows above described simple process including leveling with the pressing member 33 to form the uniform single particle layer. The adjustment of the embedded rate in the present embodiment is done by the pressing time of the pressing member 33. An adjustment method of the embedded rate of the fine particles in the elastic layer is not particularly limited the above and can be appropriately selected according to the purpose. For example, changing the force of the pressing member 33 can easily achieve the adjustment of the embedded rate. For example, although the embedded rate depends on viscosity and solid content of the flow casting coating liquid, an amount of the solvent therein, and a material of the particles, the embedded rate of 50% or more and 100% or less can be relatively and easily achieved by adjusting the force, as a guide, to the range of 1 mN/cm to 1,000 mN/cm with the flow cast coating liquid having the viscosity of 100 mPas to 100,000 mPas. After the fine particles are uniformly arranged on the surface, heating at a predetermined temperature for a predetermined time during the rotation of the metal mold cures the elastic layer to form the elastic layer in which the particles are embedded. After sufficiently cooling, the elastic layer together with the base layer is removed from the metal mold, and the desired intermediate transfer belt (seamless belt) is obtained.

The method for measuring the embedded rate of the particles in the intermediate transfer belt is not particularly limited and can be appropriately selected according to the purpose. For example, the observation of the cross section of the intermediate transfer belt with a scanning electron microscope (SEM) or a laser microscope enables the measurement of the embedded rate of the particles.

The resistance of the intermediate transfer belt thus produced is adjusted by varying an amount of the carbon black, or ion conductive agent. At this time, attention is paid because the resistance tends to change depending on the size of the particle and the occupied area ratio.

The resistance value of the intermediate transfer belt is preferably $1\times10^8 \Omega/\square$ to $1\times10^{13}\Omega/\square$ in the surface resistivity, and $1\times10^8$ $\Omega\cdot cm$ to $1\times10^{11}$ $\Omega\cdot cm$ in the volume resistivity. The resistance of the intermediate transfer belt is adjusted by varying an amount of the carbon black, or ion conductive agent. At this time, attention is paid because the resistance tends to change depending on the size of the particle and the occupied area ratio. As for the measurement of the resistance, a commercially available measuring device can be used, and for example, the resistance can be measured using Hiresta, manufactured by Mitsubishi Chemical Analytech Co., Ltd. The use of fine particles having high volume resistivity and low volume resistivity on the elastic layer surface does not affect the resistance measurement of the entire belt. This seems to be due to the small size of the particles.

Image Forming Apparatus and Image Forming Method

The image forming apparatus of the present disclosure includes an image bearer to form a latent image thereon and bear a toner image thereon; a developing device to develop the latent image formed on the image bearer with a toner; an intermediate transferor to primary transfer thereon the toner image developed by the developing device; and a transfer unit to secondary transfer the toner image on the intermediate transferor onto a recording medium. The image forming apparatus of the present disclosure may include appropriately selected other units such as a discharger, a cleaner, a recycle device and a controller if needed. The intermediate transferor used in the image forming apparatus is the above-described intermediate transferor of the present disclosure. Further, preferably, the image forming apparatus is a full-color image forming apparatus, and more preferably, the full-color image forming apparatus has a plurality of latent image bearers arranged in series each of which has a developing device for one color.

An image forming method of the present disclosure includes a developing step to develop a latent image formed on an image bearer capable of carrying a toner image with toner, a primary transfer step to transfer the toner image developed in the developing step onto an intermediate transferor, and a secondary transfer step to transfer the toner image borne on the intermediate transferor onto a recording medium, and may further include other step as necessary.

The intermediate transferor used in the belt portion provided in the image forming apparatus is described in detail below with reference to a schematic diagram of a main part, taking as an example an intermediate transfer belt, which is a preferred embodiment of the present disclosure. The schematic diagram is one example, and the present disclosure is not limited thereto.

Figure 4:
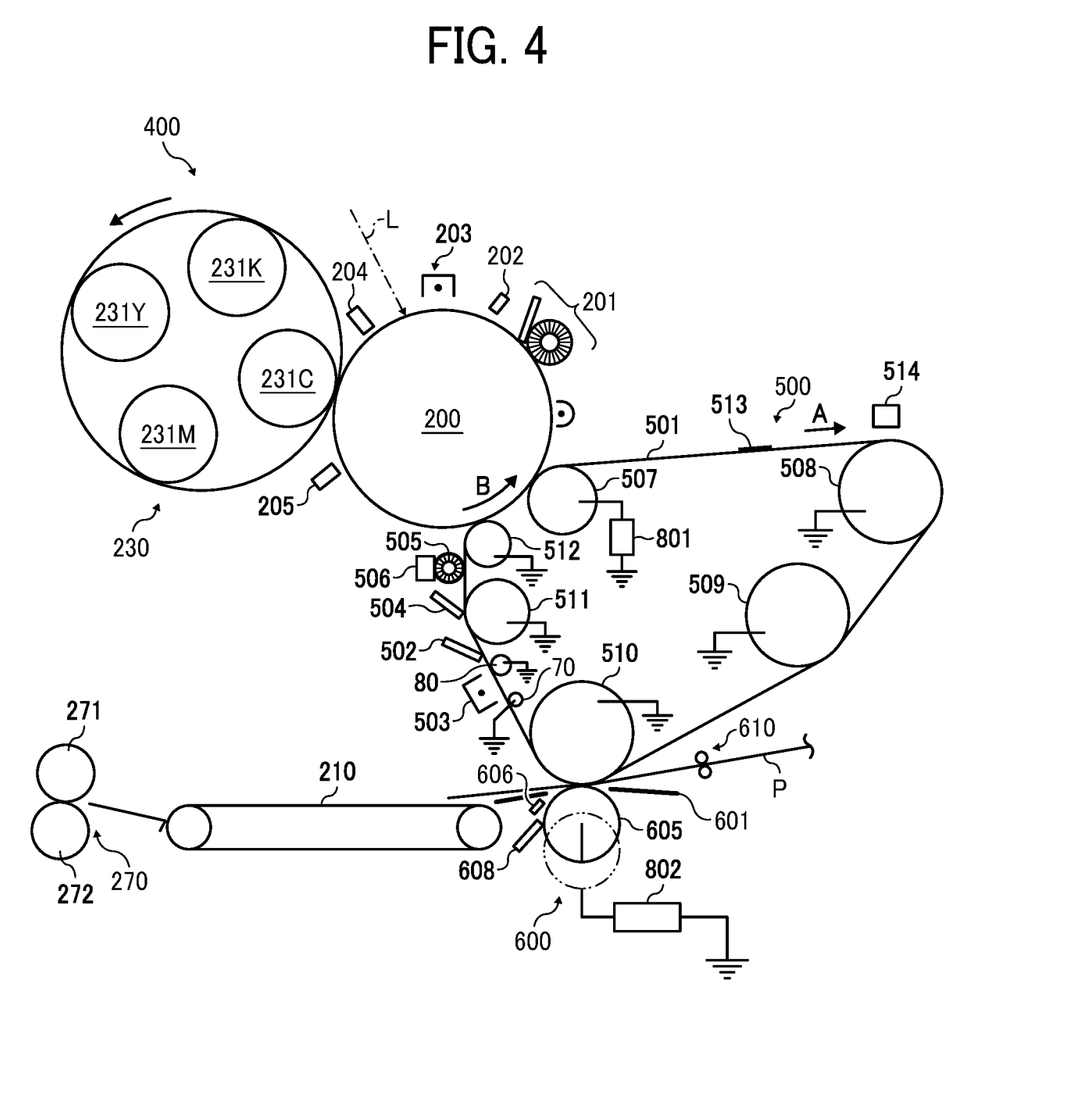
FIG. 4 is a schematic view of a main part in an image forming apparatus according to an embodiment of the present disclosure.

FIG. 4 is a schematic view illustrating a main part of the image forming apparatus 400 having the intermediate transfer belt (seamless belt) obtained by the manufacturing method according to the present disclosure as the belt member. An intermediate transfer unit 500 including the belt member illustrated in FIG. 4 includes the intermediate transfer belt 501 which is the intermediate transferor stretched around a plurality of rollers. Around the intermediate transfer belt 501, there are a secondary transfer bias roller 605 serving as a secondary transfer charge providing unit of a secondary transfer unit 600, a belt-cleaning blade 504 serving as an intermediate transferor cleaner, a lubricant application brush 505 that is a lubricant application member, and the like on the intermediate transfer belt 501.

Further, a position detection mark is provided on the outer peripheral surface or the inner peripheral surface of the intermediate transfer belt 501. The position detection mark provided on the outer peripheral surface of the intermediate transfer belt 501 needs to be provided to avoid the belt-cleaning blade 504. When this is difficult, the position detection mark may be provided on the inner peripheral surface of the intermediate transfer belt 501. An optical sensor 514 as a mark detection sensor is provided at a position between a primary transfer bias roller 507 and a belt driving roller 508, on which the intermediate transfer belt 501 is bridged.

The intermediate transfer belt 501 is stretched taut around by the primary transfer bias roller 507 that is a primary transfer charge applying unit, the belt driving roller 508, a belt tension roller 509, a secondary transfer opposite roller 510, a cleaning opposite roller 511, and a feedback current detecting roller 512. Each roller is made of a conductive material, and each roller other than the primary transfer bias roller 507 is grounded. The primary transfer power source 801 subjected to constant current or constant voltage control applies a transfer bias controlled to a predetermined current or predetermined voltage according to the number of toner images to be superimposed on the primary transfer bias roller 507.

The driving motor rotates the belt driving roller 508 and rotates the intermediate transfer belt 501 in the direction of arrow A in FIG. 4. The intermediate transfer belt 501 as the belt member is usually a semiconductor or an insulator and has a single layer or multilayer structure. A seamless belt is preferably used in the present disclosure. This is useful for improvement of durability and realization of excellent image formation. The intermediate transfer belt 501 is larger than the maximum allowable sheet size to superimpose toner images formed on a photoconductor drum 200.

The secondary transfer bias roller 605 serving as a secondary transfer unit faces the outer peripheral surface of the intermediate transfer belt 501 stretched around the secondary transfer opposite roller 510. A contact-separation mechanism described later moves the secondary transfer bias roller 605 to contact with or separate from the intermediate transfer belt 501. The transfer sheet P as a recording medium is sandwiched between the secondary transfer bias roller 605 and the intermediate transfer belt 501 stretched around the secondary transfer opposite roller 510. A secondary transfer power source 802 that is subjected to the constant current control applies a transfer bias of a predetermined current to the secondary transfer bias roller 605.

The registration roller 610 feeds the transfer sheet P as a transfer material between the secondary transfer bias roller 605 and the intermediate transfer belt 501 stretched around the secondary transfer opposite roller 510 at a predetermined timing. Further, a cleaning blade 608 as a cleaning unit abuts the secondary transfer bias roller 605. The cleaning blade 608 removes deposits adhering to the surface of the secondary transfer bias roller 605 and cleans the surface of the secondary transfer bias roller 605. Additionally, the image forming apparatus 400 includes a discharging roller 70, a ground roller 80, a potential sensor 204, an image density sensor 205, and a charger 203. The toner image 513 is formed on the intermediate transfer belt 501.

In the color copier having the above-described configuration, at the start of the image forming cycle, the driving motor rotates the photoconductor drum 200 in a counter-clockwise direction indicated by an arrow B in FIG. 4. A black toner image, a cyan toner image, a magenta toner image, and a yellow toner image are formed on the photoconductor drum 200. The belt driving roller 508 rotates the intermediate transfer belt 501 in the clockwise direction indicated by the arrow A in FIG. 4. While the intermediate transfer belt 501 rotates, the transfer bias due to the voltage applied to the primary transfer bias roller 507 causes the black toner image, the cyan toner image, the magenta toner image, and the yellow toner image to be transferred from the photoconductor drum 200 to the intermediate transfer belt 501, and, finally, the toner images are superimposed on the intermediate transfer belt 501 in the order of black, cyan, magenta and yellow to form a color image.

For example, the black toner image is formed as follows. In FIG. 4, the charger 203 uniformly charges the surface of the photoconductor drum 200 to a predetermined potential with a negative charge by corona discharge. A controller determines an exposure timing based on the detection signal from the optical sensor 514 that detects the position detection mark and a writing optical unit performs a raster exposure with a laser light L based on a black color image signal. Upon exposure of this raster image, the exposed portion on the surface of the uniformly charged photoconductor drum 200 loses charge proportional to the exposure light amount, and a black electrostatic latent image is formed. When the negatively charged black toner on the developing roller of a black developing device 231K contacts the black electrostatic latent image, the toner does not adhere to the portion where the electric charge of the photoconductor drum 200 remains, and adheres the portion where the electric charge is lost, that is, the exposed portion. As a result, a black toner image similar to the electrostatic latent image is formed.

The black toner image formed on the photoconductor drum 200 as described above is primarily transferred to the outer peripheral surface of the intermediate transfer belt 501 driven to rotate at a constant speed in contact with the photoconductor drum 200. In order to use the photoconductor drum 200 again, the cleaner 201 cleans some untransferred residual toner remaining on the surface of the photoconductor drum 200 after the primary transfer. On the photoconductor drum 200, the cyan image forming process starts after the black image forming process, the color scanner starts reading the cyan image data at a predetermined timing, and the laser light writing by the cyan image data forms a cyan electrostatic latent image on the surface of the photoconductor drum 200.

Then, after the rear end portion of the black electrostatic latent image passes a developing position and before the tip portion of the cyan electrostatic latent image reaches the developing position, the revolver-developing device 230 rotates. After the cyan developing device 231C is set at the developing position, the cyan developing device 231C develops the cyan electrostatic latent image with the cyan toner. When the development of the cyan electrostatic latent image is completed and the trailing end portion of the cyan electrostatic latent image has passed through the developing position, the revolver-developing device 230 rotates in the same manner as in the case of the black developing device 231K, and the magenta developing device 231M is set at the developing position. The magenta developing device 231M also completes the development of the magenta image before the tip portion of the next yellow electrostatic latent image reaches the developing position. Subsequently, the Yellow developing device 231Y develops the yellow electrostatic latent image. The operation of reading color image data, electrostatic latent image formation, and development with respect to the cyan, magenta, and yellow image forming processes is the same as the above-described black image forming process. Therefore, their explanation is omitted.

The toner images of black, cyan, magenta, and yellow sequentially formed on the photoconductor drum 200 in this manner are sequentially positioned on the same surface of the intermediate transfer belt 501 and primarily transferred. As a result, a toner image in which four colors are superimposed at maximum on the intermediate transfer belt 501 is formed. On the other hand, at the start of the image forming cycle, the transfer sheet P is fed from a sheet feeder such as a sheet tray or a bypass feeder, and stands by at the nip of registration rollers 610. When the leading edge of the toner image on the intermediate transfer belt 501 reaches the secondary transfer portion where the nip is formed by the intermediate transfer belt 501 stretched around the secondary transfer opposite roller 510 and the secondary transfer bias roller 605, the registration roller 610 rotates so as to convey the transfer sheet P along a transfer sheet guide plate 601 so that the leading end of the transfer paper P coincides with the leading edge of the toner image. In this way, registration of the transfer sheet P and the toner image is performed.

When the transfer sheet P enters the secondary transfer portion, the transfer bias due to the voltage applied to the secondary transfer bias roller 605 by the secondary transfer power source 802 secondarily transfers the four-color superimposed toner image on the intermediate transfer belt 501 onto the transfer sheet P at the same time. The secondary transfer bias roller 605 conveys the transfer sheet P along the transfer sheet guide plate 601. A transfer sheet discharger 606 including a discharge needle disposed at the downstream of the secondary transfer portion discharges the transfer sheet P passing over the transfer sheet discharger 606. After discharging the transfer sheet P, a belt conveyor 210 feeds the transfer sheet P toward the fixing device 270. Then, the fixing device 270 melts and fixes the toner image on the transfer sheet P at the nip portion between the fixing rollers 271 and 272. After fixing, a discharge roller feeds the transfer sheet P out of the main body of the apparatus. The transfer sheet P is stacked face up on the copy tray. The fixing device 270 may be provided with a belt component if necessary.

On the other hand, the cleaner 201 cleans the surface of the photoconductor drum 200 after the primary transfer, and a discharge lamp 202 uniformly removes a charge on the surface of the photoconductor drum 200. A belt-cleaning blade 504 cleans the residual toner remaining on the outer peripheral surface of the intermediate transfer belt 501 after the toner image is secondarily transferred onto the transfer sheet P. The belt-cleaning blade 504 is configured to come into contact with and separate from the outer peripheral surface of the intermediate transfer belt 501 at a predetermined timing by a cleaning member contact-separation mechanism.

On the upstream side of the belt-cleaning blade 504 in the direction of movement of the intermediate transfer belt 501, a toner seal member 502 that contacts and separates from the outer peripheral surface of the intermediate transfer belt 501 is provided. When the belt-cleaning blade 504 cleans the residual toner on the intermediate transfer belt 501, the toner falls. The toner seal member 502 receives the fallen toner and prevents the fallen toner from scattering onto the transfer path of the transfer sheet P. The cleaning member contact-separation mechanism brings the toner seal member 502 and the belt-cleaning blade 504 into contact with or separates from the outer peripheral surface of the intermediate transfer belt 501.

A lubricant application brush 505 scrapes a lubricant 506 and applies the scraped lubricant to the outer peripheral surface of the intermediate transfer belt 501 from which the residual toner is removed as described above. The lubricant 506 is made of a solid material such as zinc stearate, for example, and is disposed to contact the lubricant application brush 505. A belt discharging brush contacting the outer peripheral surface of the intermediate transfer belt 501 is applied a discharging bias and removes the residual charge remaining on the outer peripheral surface of the intermediate transfer belt 501. Each of the lubricant application brush 505 and the belt discharging brush has a contact-separation mechanism, and comes into contact with and separates from the outer peripheral surface of the intermediate transfer belt 501 at a predetermined timing.

When the image forming apparatus 400 forms the second image on the second sheet subsequently, the image forming apparatus 400 continues the color scanner operation and the image formation of the first color (black) on the photoconductor drum 200 for the second sheet after the color scanner operation and the image formation of the fourth color (yellow) on the photoconductor drum 200 for the first sheet at a predetermined timing. After a collective transfer process that transfers the four-color superimposed toner image onto the first transfer sheet, the black toner image for the second sheet is primarily transferred onto the area of the outer peripheral surface of the intermediate transfer belt cleaned by the belt-cleaning blade 504. After that, the same operation as the first sheet is executed. The above is a copy mode for obtaining a full color copy of four colors. In the case of a three-color copy mode and a two-color copy mode, the same operation as described above is performed for the designated color and the number of times. In the case of the monochrome copy mode, until a designated number of copies are completed, only the developing device of the designated color in the revolver-developing device 230 is in a developing operation state, and the belt-cleaning blade 504 remains in contact with the intermediate transfer belt 501.

Figure 5:
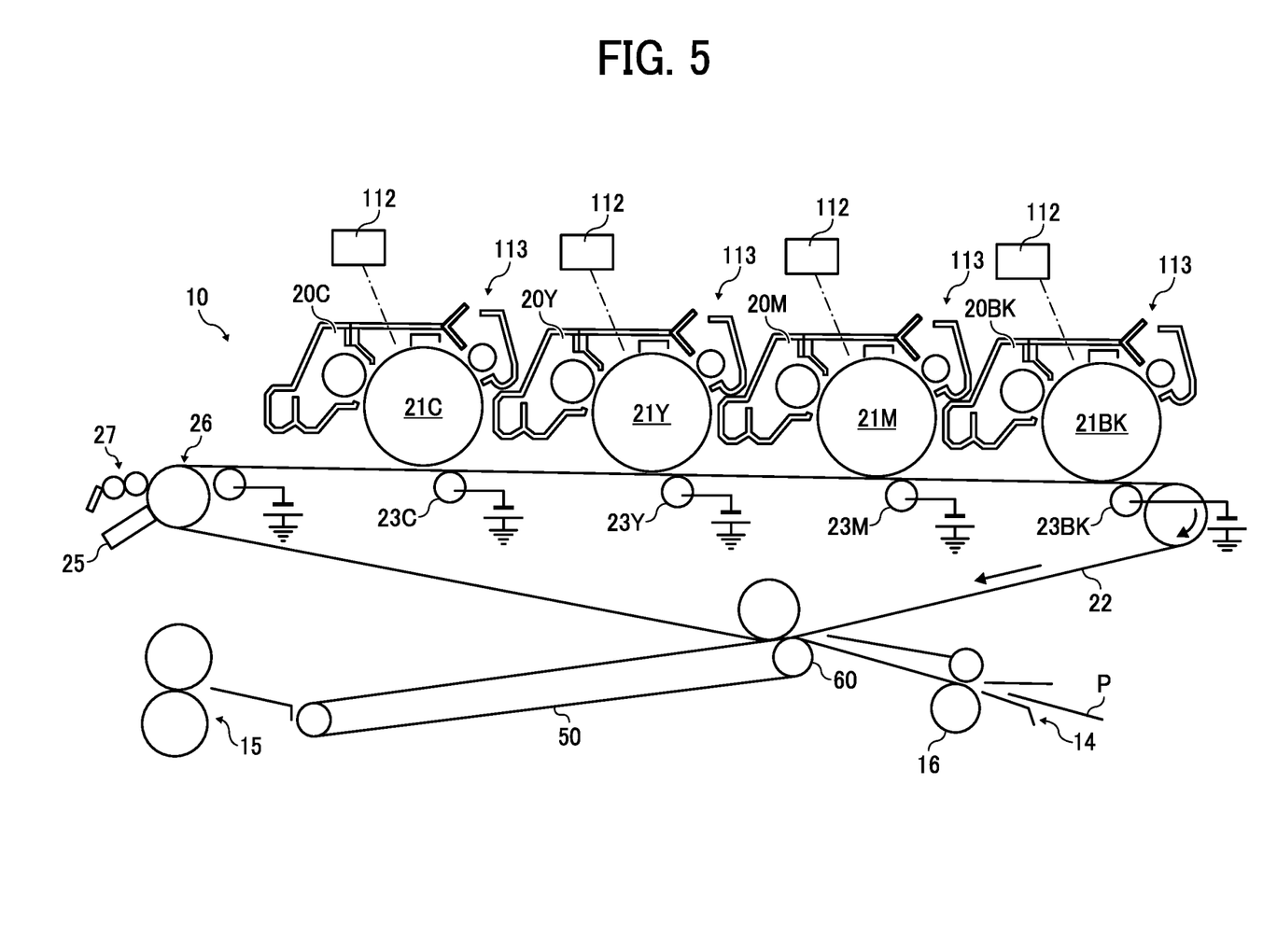
FIG. 5 is a schematic view of a main part in an image forming apparatus according to another embodiment of the present disclosure.

In the above embodiment, the copier having only one photoconductor is described. The present disclosure is also applicable to an image forming apparatus in which a plurality of photoconductors are disposed along the intermediate transfer belt made of the seamless belt, for example, as illustrated in an example of its structure in the schematic view of FIG. 5. FIG. 5 illustrates a configuration example of a four-drum type digital color printer having four photoconductors 21Bk, 21Y, 21M and 21C for forming toner images of four different colors (black, yellow, magenta and cyan).

In FIG. 5, a printer main body 10 includes an image writing device 112, an image forming unit 113, and a sheet feeder 14 to form the color image by the electrophotographic method. An image processing unit of the printer performs image processing on a received image signal, converts the image signal into color signals for image formation of black (Bk), magenta (M), yellow (Y), and cyan (C), and transmits the color signal to the image writing device 112. The image writing device 112 is, for example, a laser scanning optical system including a laser light source, a deflector such as a rotating polygon mirror, a scanning imaging forming optical system, and a mirror group. The image writing device 112 has four writing light paths corresponding to the respective color signals, and executes image writing corresponding to each color signal on each of image bearers (photoconductors) 21BK, 21M, 21Y, and 21C provided for each color section in the image forming unit 113.

The image forming unit 113 includes photoconductors 21Bk, 21M, 21Y, and 21C which are image bearers for black (Bk), magenta (M), yellow (Y), and cyan (C). Each photoconductor is typically an organic photoconductor (OPC). Around each of the photoconductors 21Bk, 21M, 21Y, and 21C, a charging device, an exposure portion of laser light from the image writing device 112, developing devices 20Bk, 20M, 20Y, and 20C for black, magenta, yellow, and cyan, primary transfer bias rollers 23Bk, 23M, 23Y, and 23C as primary transfer units, a cleaning device, a photoconductor discharger, and the like are disposed. The developing devices 20Bk, 20M, 20Y, and 20C use two-component magnetic brush developing method. The intermediate transfer belt 22, which is a belt component, is sandwiched between the photoconductors 21Bk, 21M, 21Y, and 21C and the primary transfer bias rollers 23Bk, 23M, 23Y, and 23C. A color toner image formed on each of the photoconductors is transferred and superimposed sequentially.

On the other hand, after the transfer sheet P is fed from the sheet feeder 14, the transfer sheet P is carried on the transfer conveyance belt 50, which is a belt component, via the registration rollers 16. A secondary transfer bias roller 60 as a secondary transfer unit secondarily transfers the toner image on the intermediate transfer belt 22 onto the transfer sheet P at the point where the intermediate transfer belt 22 and the transfer conveyance belt 50 contact. As a result, the color image is formed on the transfer sheet P. The transfer conveyance belt 50 conveys the transfer sheet P on which the color image is formed to the fixing device 15 and the fixing device 15 fixes the transferred image. After fixing, the transfer sheet with the image is discharged to the outside of the printer body.

A belt-cleaning unit 25 removes the residual toner remaining on the intermediate transfer belt 22 without being transferred during the secondary transfer from the intermediate transfer belt 22. On the downstream side of the belt-cleaning unit 25, a lubricant application device 27 is disposed. The lubricant application device 27 includes a solid lubricant and a conductive brush that rubs against the intermediate transfer belt 22 and applies the solid lubricant. The conductive brush usually contacts the intermediate transfer belt 22 to apply the solid lubricant to the intermediate transfer belt 22. The solid lubricant enhances the cleaning property of the intermediate transfer belt 22, prevents occurrence of filming, and improves durability. A driving roller 26 rotates the intermediate transfer belt 22.

EXAMPLES

Examples of the present disclosure as described below are given for illustration of the present disclosure and are not intended to be limiting thereof.

Measurement of Resistivity (Value)

Measurement of the volume resistivity of the fine particles was carried out using MCP-PD 51, Loresta GP, and Hiresta UP manufactured by Mitsubishi Chemical Analytech Co., Ltd. At 23° C. and 50% RH, 1 g of fine particles were placed in a 15 mmφ pressurized vessel and pressurized with a load of 4 KN. After that, the value measured at 20 KV was read to calculate the volume resistivity. Also, measurement of the resistivity of the intermediate transfer belt was carried out using the Hiresta UP. Under the environment 23° C. and 50% RH, the surface resistivity and volume resistivity was measured after 10 seconds since a bias of 500 V was applied.

Example 1

Production of Base Layer

A coating solution for a base layer was prepared as follows. Using this coating solution, the base layer of a seamless intermediate transfer belt was prepared.

Preparation of Base Layer Coating Solution

First, a dispersion liquid prepared in advance by dispersing in N-methyl-2-pyrrolidone, carbon black (Special Black 4, manufactured by Evonik Degussa Japan Co., Ltd.) using a bead mill was blended with polyimide varnish (U-varnish A, manufactured by Ube Industries, Ltd.) containing polyimide resin precursor (polyamic acid) as a main component so that the carbon black content became 17% by mass of the polyamic acid solid content. The resultant was sufficiently stirred and mixture to thereby prepare a coating solution.

Production of Polyimide Base Layer Belt

Next, a metal cylindrical support having an outer diameter of 500 mm and a length of 400 mm, surface of which had been roughened by a blast treatment, was used as a mold, and was mounted in a roll coating device. Subsequently, the base layer coating solution was poured into a pan, the coating solution was drawn up at a rotational speed of the coating roller of 40 mm/sec. A thickness of the coating solution on the coating roller was controlled by setting a gap between a regulating roller and the coating roller to 0.6 mm. Thereafter, the rotational speed of the cylindrical support was controlled at 35 mm/sec, and was brought close to the coating roller. Setting the gap between the cylindrical support and the coating roller to 0.4 mm, the coating solution on the coating roller was uniformly transferred and coated on the cylindrical support. While maintaining the rotation of the cylindrical support, the cylindrical support on which the coating solution had been applied was introduced into a hot air circulating dryer to gradually increase the temperature to 110° C., and heated the applied coating solution for 30 minutes. The temperature was further increased to 200° C. and heated at the same temperature for 30 minutes, followed by stopping the rotation. Thereafter, the resultant was introduced into a heating furnace capable of performing a high temperature treatment (baking furnace), and the temperature was increased stepwise up to 320° C. to perform heating (baking) for 60 minutes. The resultant was then sufficiently cooled, to produce polyimide base layer belt having a film thickness of 60 μm.

Production of Elastic Layer

Below ingredients were blended at the following compounding ratio, and the resultant was kneaded to thereby produce a rubber composition.

Acrylic rubber (Nipol AR 12, manufactured by Zeon Corporation): 100 parts by mass Stearic acid (Beads Stearic Acid Tsubaki, manufactured by NOF Corporation): 1 part by mass Red phosphorus (Nova Excel 140F, manufactured by RIN KAGAKU KOGYO Co., Ltd.): 10 parts by mass Aluminum hydroxide (Heidilite H42M, manufactured by Showa Denko KK): 40 parts by mass Crosslink agent (Diak. No. 1, hexamethylenediamine carbamate, manufactured by Du Pont Dow Elastomer Japan): 0.6 parts by mass Crosslinking promoter (VULCOFAC ACT 55 (70% by weight of 1,8-diazabicyclo (5,4,0) undecene-7 and dibasic acid salt, 30% by weight amorphous silica, manufactured by Safic alcan): 0.6 parts by mass Next, the obtained rubber composition was dissolved in an organic solvent (methyl isobutyl ketone, MIBk) to thereby prepare a rubber solution having a solid content of 35% by mass. While rotating the cylindrical support on which the polyimide base layer had been produced, the prepared rubber solution was spirally applied onto the polyimide base layer by continuously ejecting the rubber solution from a nozzle and moving the nozzle along the axial direction of the support. The coating amount was controlled to an amount with which a final thickness of the center portion of the belt became 400 μm. Thereafter, the cylindrical support coated with the rubber solution was rotated as it was charged into a hot air circulating dryer, heated to 90° C. at a heating rate of 4° C./min, and heated for 30 minutes.

Production of Conductive Fine Particles

Denatron PT-434 (manufactured by Nagase ChemteX Corporation) that is a polythiophene-based conductive polymer was spray-coated on the surface of Techpolymer SSX 102 (particle size 2 μm, manufactured by Sekisui Plastics Co., Ltd.,) that is a spherical acrylic resin particle, and, after that, the spray-coated particles are dried at 120° C. for 1 hour to prepare conductive fine particles A. Spray coating was adjusted so that the volume resistivity of the fine particles finally became $2.1 \times 10^2$ Ω·cm.

Application of Fine Particles to the Surface of the Elastic Layer

Next, using the method illustrated in FIG. 3, the surface of the elastic layer 32 was evenly coated with the conductive fine particles A and the pressing member 33 made of a polyurethane rubber blade was pressed with a force of 100 mN/cm and fixed the conductive fine particles A on the surface of the elastic layer. Subsequently, the resultant was re-introduced into a hot air circulating dryer, heated to 170° C. at the heating rate of 4° C./min, and subjected to a heat treatment for 60 minutes, to thereby obtain the intermediate transfer belt A.

Example 2

An intermediate transfer belt B of Example 2 was obtained in the same manner as in Example 1 except that Denatron PT-434 of the Example 1 was changed to Denatron P-502 RG (manufactured by Nagase ChemteX Corporation) and spray-coated to prepare conductive fine particles B. The volume resistivity of the conductive fine particles B was $4.4 \times 10^5$ Ω·cm.

Example 3

The steps of coating and drying in the spray coating for producing the conductive fine particles A of Example 1 were repeated twice to prepare conductive fine particles C having the volume resistivity of $7.5 \times 10^0$ Ω·cm, and the fine conductive particles C are used. Other than that, the intermediate transfer belt C was obtained in the same manner as in Example 1.

Example 4

Conductive fine particles D were prepared in the same manner as in Example 1 except that the Techpolymer SSX 102 in Example 1 was changed to melamine resin particles Epostar S6 (average particle size: 0.4 μm, manufactured be Nippon Shokubai Co., Ltd.). The volume resistivity of the conductive fine particles D was $1.6 \times 10^1$ Ω·cm. Thereafter, in the same manner as in Example 1, an intermediate transfer belt D was obtained.

Example 5

Conductive particles E were prepared in the same manner as in Example 1 except that the Techpolymer SSX 102 in Example 1 was changed to silicone resin particles Tospearl 2000B (average particle size: 6 μm, manufactured be Momentive Performance Materials Co., Ltd.). The volume resistivity of the conductive fine particles E was $5.5 \times 10^5$ Ω·cm. Thereafter, in the same manner as in Example 1, an intermediate transfer belt E was obtained.

Comparative Example 1

Without using the fine conductive particles A in Example 1, Techpolymer SSX 102 was not coated with a conductive polymer and used as it was.

Other than that, the intermediate transfer belt F was obtained in the same manner as in Example 1. The volume resistivity of Techpolymer SSX 102 was not measured because it was too high ($1 \times 10^{14}$ Ω·cm or more).

Comparative Example 2

STC-3 (average particle diameter: 2.6 μm, manufactured by Mitsui Kinzoku Co., Ltd.) that is spherical solder powder (tin, silver, copper) in which fine powder was removed was used in place of the techpolymer SSX 102 in Comparative Example 1. Other than that, the intermediate transfer belt G was obtained in the same manner as in Comparative Example 1. The volume resistivity of STC-3 was $3.2 \times 10^{-6}$ Ω·cm.

Comparative Example 3

Dynamic Beads UCN-8070CM Clear (average particle diameter: 7 μm, manufactured by Dainichiseika) that is polyurethane spherical fine particles was used in place of the techpolymer SSX 102 in Comparative Example 1. Other than that, the intermediate transfer belt H was obtained in the same manner as in Comparative Example 1. The volume resistivity of Dynamic Beads UCN-8070CM Clear was $6.3 \times 10^9$ Ω·cm.

Comparative Example 4

Tospearl 120 (average particle size: 2 μm, manufactured by Momentive Performance Materials Co., Ltd.), that is, silicone spherical fine particles, was used in place of the techpolymer SSX 102 in Comparative Example 1. Other than that, the intermediate transfer belt I was obtained in the same manner as in Comparative Example 1. The volume resistivity of Tospearl 120 was not measured because it was too high ($1 \times 10^{14}$ Ω·cm or more).

Comparative Example 5

On the surface of Tospearl 120 used in Comparative Example 4, a solution prepared by diluting Denatron P-502 RG (Nagase ChemteX Corporation) which is a polythiophene-based conductive polymer by 10 times with ethanol was spray coated. Thereafter, the spray-coated particles were dried at 110° C. for 30 minutes to prepare electroconductive fine particles J. Spray coating was adjusted so that the volume resistivity of the fine particles finally became $3.4 \times 10^7$ Ω·cm. Thereafter, in the same manner as in Comparative Example 1, an intermediate transfer belt J was obtained.

With respect to each of the intermediate transfer belts A to H obtained in the respective examples and comparative examples, the transferability and the cleaning property were evaluated in the following manner. The results were presented in Tables 1-1 and 1-2. The intermediate transfer belts A to J were set in the image forming apparatus illustrated in FIG. 5. A surface coated thick paper (POD gross coated paper) was prepared as a paper with low halftone transferability. Black monochrome halftone images were output in monochrome mode that use a low transfer current and full color mode that use a high transfer current, respectively, and the transferability of the toner was evaluated.

Evaluation Criteria of Transferability

The transferability was evaluated based on the following criteria;

Very good: transfer rate is equal to or greater than 90%
Good: transfer rate is 80 to 89.9%

Fair: Transfer rate is 70 to 79.9%
Poor: transfer rate is less than 70%

Further, the cleaning property of the belt was evaluated as follows. After an image is output by using the above-described intermediate transfer belts A to J, the surfaces of the intermediate transfer belts were observed with a laser microscope. A cleaning failure was evaluated based on whether the toner remained between the particles on the intermediate transfer belt.

TABLE 1-1

| | Intermediate transfer belt type | Volume resistivity of fine particle ($\Omega \cdot$ cm) | Surface resistivity of belt ($\Omega/\square$) | Volume resistivity of belt ($\Omega/\square$) |
|---|---|---|---|---|
| Example 1 | A | $2.1 \times 10^2$ | $1.6 \times 10^{11}$ | $8.4 \times 10^9$ |
| Example 2 | B | $4.4 \times 10^5$ | $1.7 \times 10^{11}$ | $8.3 \times 10^9$ |
| Example 3 | C | $7.5 \times 10^0$ | $1.5 \times 10^{11}$ | $8.4 \times 10^9$ |
| Example 4 | D | $1.6 \times 10^1$ | $1.5 \times 10^{11}$ | $8.5 \times 10^9$ |
| Example 5 | E | $5.5 \times 10^5$ | $1.7 \times 10^{11}$ | $8.4 \times 10^9$ |
| Comparative Example 1 | F | $>1 \times 10^{14}$ | $1.7 \times 10^{11}$ | $8.4 \times 10^9$ |
| Comparative Example 2 | G | $3.2 \times 10^{-6}$ | $1.2 \times 10^{11}$ | $8.3 \times 10^9$ |
| Comparative Example 3 | H | $6.3 \times 10^9$ | $1.6 \times 10^{11}$ | $8.4 \times 10^9$ |
| Comparative Example 4 | I | $>1 \times 10^{14}$ | $1.7 \times 10^{11}$ | $8.5 \times 10^9$ |
| Comparative Example 5 | J | $3.4 \times 10^7$ | $1.6 \times 10^{11}$ | $8.5 \times 10^9$ |

TABLE 1-2

| | Monochrome halftone transferability | Full color halftone transferability | Cleaning property |
|---|---|---|---|
| Example 1 | Very good | Very good | Good |
| Example 2 | Good | Good | Good |
| Example 3 | Good | Good | Good |
| Example 4 | Very good | Very good | Good |
| Example 5 | Good | Good | Poor |
| Comparative Example 1 | Fair | Poor | Good |
| Comparative Example 2 | Poor | Poor | Good |
| Comparative Example 3 | Good | Fair | Good |
| Comparative Example 4 | Fair | Poor | Good |
| Comparative Example 5 | Good | Fair | Good |

From the above results, the following is confirmed: Although the volume resistivity of the fine particles varied from $3.2 \times 10^{-6}$ to $1 \times 10^{14}$ $\Omega \cdot$cm or more, there is little change in the measured resistivity of the intermediate transfer belt itself. However, halftone transferability is very different between the intermediate transfer belts A to E and the intermediate transfer belts F and H having a higher volume resistivity of the fine particles than the intermediate transfer belts A to E, especially in the full color mode. By contrast, in the intermediate transfer belt G having a smaller volume resistivity of the fine particles than the intermediate transfer belts A to E, the toner could not be transferred at all. These results indicate that the transferability of halftone becomes low when the volume resistivity of the fine particles is too high or too low. In addition, when fine particles having a particle diameter of 6 μm were used, although the transferability of halftone is satisfactory, cleaning property was not good because untransferred residual toner was found in the gaps between the particles (See the result of Example 5 of the intermediate transfer belt E).

As described in the above examples, according to the present disclosure, halftone transferability in full color mode is improved. Additionally, the intermediate transferor according to the present disclosure has sufficient transferability for the special transfer medium and high cleaning property.

Aspects of the present disclosure are, for example, as follows.

<1> The intermediate transferor includes a base layer, an elastic layer layered on the base layer, and fine particles to form a convex-concave shape on the surface of the elastic layer. The fine particles have a volume resistivity of $1 \times 10^0$ $\Omega \cdot$cm to $1 \times 10^6$ $\Omega \cdot$cm.

<2> In the intermediate transferor according to <1>, the fine particles are spherical fine particles.

<3> In the intermediate transferor according to <2>, the spherical fine particles have an average particle diameter of 5 μm or less.

<4> In the intermediate transferor according to <1>, the fine particles may further have a volume resistivity of $1 \times 10^1$ $\Omega \cdot$cm to $1 \times 10^3$ $\Omega \cdot$cm.

<5> In the intermediate transferor according to <1>, the intermediate transferor is a seamless intermediate transfer belt.

<6> An image forming apparatus includes an image bearer on which a latent image is formed and which is capable of bearing a toner image, a developing device to develop the latent image formed on the image carrier with toner, an intermediate transferor according to <1> to primarily transfer the toner image developed by the developing device, and a secondary transfer unit to secondarily transfer the toner image borne by the intermediate transferor onto a recording medium.

<7> In the image forming apparatus according to <6>, the image bearer is a plurality of image bearers arranged in series each of which has a developing device for one color.

The intermediate transferor according to above <1> to <5> and the image forming apparatus according to any one of above <6> to <7> solves the various problems in the background art, and can achieve the object of the present disclosure.

The intermediate transferor of the present disclosure is used as an intermediate transfer belt equipped in an image forming apparatus such as a copy and a printer. In particular, the intermediate transferor of the present disclosure is suitably used for an image forming apparatus that performs full-color image formation.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An intermediate transfer belt for an image forming apparatus, comprising:
    a base layer;
    an elastic layer layered on the base layer; and
    fine particles on the elastic layer, to form an uneven surface of the elastic layer, the fine particles having a volume resistivity of $1\times10^0$ Ω·cm to $1\times10^6$ Ω·cm, wherein one or more of the fine particles includes a two-layer structure including a core and a shell, the core including an insulating particle, and the shell including a conductive laver covering the insulating particle, and wherein the fine particles are each separately aligned on the elastic laver along a plane direction thereof, the fine particles being embedded in a state where a top part of each fine particle is exposed and laminated on the elastic layer in a convex-concave shape.

2. The intermediate transfer belt according to claim 1, wherein the fine particles are spherical fine particles.

3. The intermediate transfer belt according to claim 2, wherein an average particle diameter of the spherical fine particles is equal to or smaller than 5 μm.

4. The intermediate transfer belt according to claim 3, wherein the average particle diameter of the spherical fine particles is 1 μm to 2 μm.

5. The intermediate transfer belt according to claim 2, wherein an embedded rate of the fine particles in the elastic layer is 51% to 90%, the embedded rate being a percentage value obtained by dividing a length of one of the fine particles in a radial direction buried in the elastic layer by a diameter of the fine particle.

6. The intermediate transfer belt according to claim 1, wherein the intermediate transfer belt is a seamless intermediate transfer belt.

7. An image forming apparatus comprising:
an image bearer, on which a latent image is to be formed, to bear a toner image;
a developing device to develop the latent image formed on the image bearer with toner;
the intermediate transfer belt according to claim 1, on which the toner image developed by the developing device is to be primarily transferred; and
a secondary transfer unit to secondarily transfer the toner image borne by the intermediate transfer belt onto a recording medium.

8. The image forming apparatus according to claim 7, wherein a plurality of image bearers are arranged in series and disposed with a plurality of developing devices for different colors, respectively.

9. The intermediate transfer belt according to claim 1, wherein the fine particles have a volume resistivity of $1\times10^1$ Ω·cm to $1\times10^3$ Ω·cm.

10. The intermediate transfer belt according to claim 1, wherein the conductive layer is made of a conductive resin of polythiophene or polypyrrole.

11. A method for making an intermediate transfer belt for an image forming apparatus, the method comprising:
forming a base layer;
layering an elastic layer on the base layer; and
forming a bumpy surface of the elastic layer with fine particles having a volume resistivity of $1\times10^0$ Ω·cm to $1\times10^6$ Ω·cm,
wherein one or more of the fine particles includes a two-layer structure including a core and a shell, the core including an insulating particle, and the shell including a conductive laver covering the insulating particle, and
wherein the fine particles are each separately aligned on the elastic laver along a plane direction thereof, the fine particles being embedded in a state where a top part of each fine particle is exposed and laminated on the elastic layer in a convex-concave shape.

\* \* \* \* \*